Jan. 27, 1948.　　　A. BERNDT　　　2,435,122
VARIABLE SPEED CONTROL
Filed Oct. 10, 1944
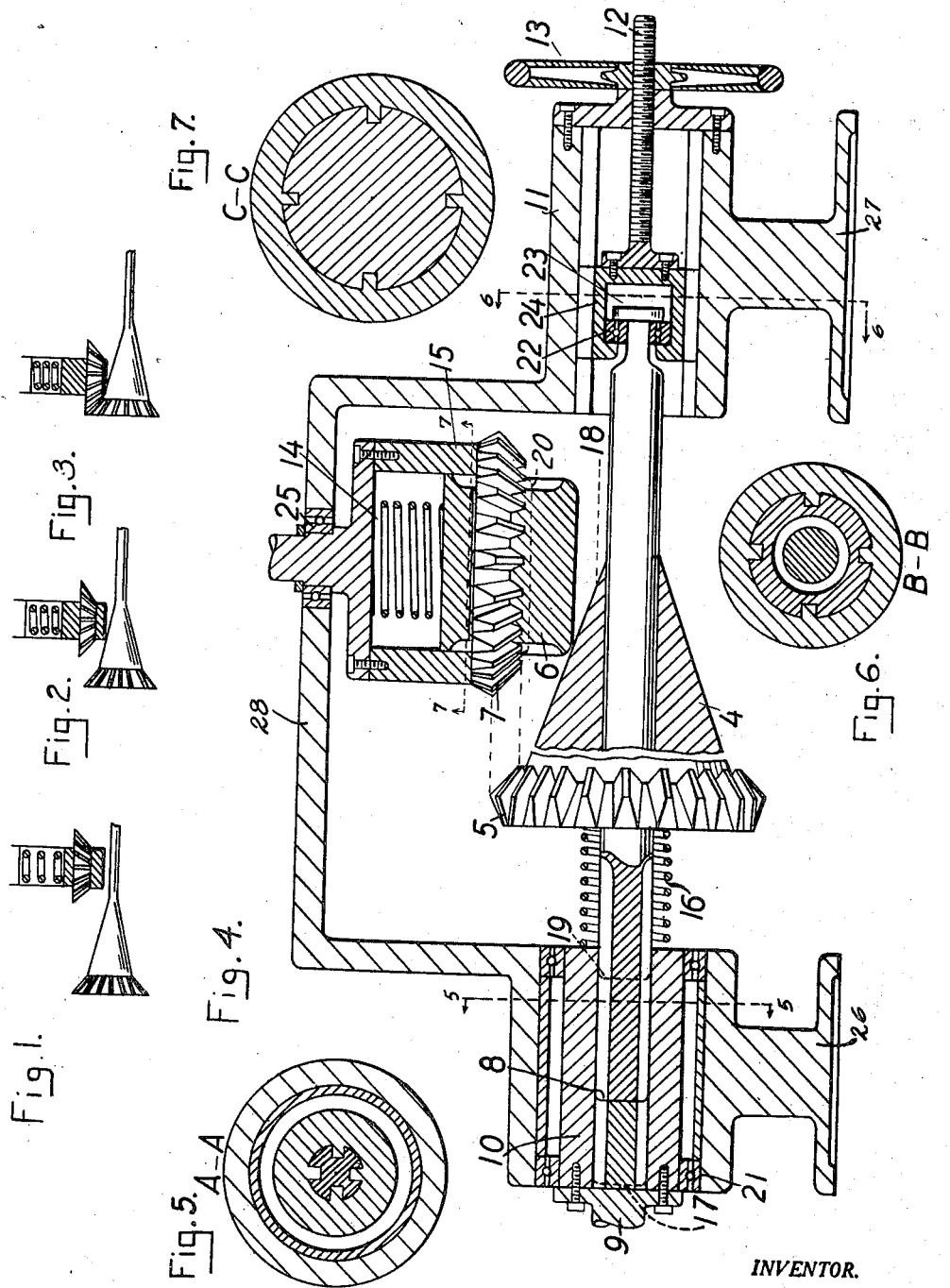
INVENTOR.
BY Arthur Berndt Patented Jan. 27, 1948

2,435,122

UNITED STATES PATENT OFFICE 2,435,122

VARIABLE-SPEED CONTROL

Arthur Berndt, New York, N. Y.

Application October 10, 1944, Serial No. 558,105

1 Claim. (Cl. 74—405)

The invention relates to variable speed control in a combined friction and toothed gearing. The object of the invention is, to connect and disconnect two shafts of different speed during rotation, thereby controlling the speed without eliminating or stopping the power, first by frictional force and after perfect synchronization meshing resp. disconnecting the teeth of the gears, as hereinafter described and illustrated in the accompanying drawing, in which:

Fig. 1, Fig. 2 and Fig. 3 show schematically the gearing operated at three phases, Fig. 4 is a sectional view of the gearing device, Fig. 5, Fig. 6 and Fig. 7 are sections along the lines 5—5, 6—6 and 7—7 of Fig. 4.

Referring to Fig. 1, Fig. 2 and Fig. 3 of the drawing: three different phases of the gearing device are schematically illustrated. Fig. 1 shows the neutral position, Fig. 2 one of the first frictional contacts and Fig. 3 the positive engagement, meshing the teeth after perfect synchronization. The change of moving parts is demonstrated by dotted lines.

Fig. 4 shows the gearing device illustrating the beginning of frictional contact at right angle drive of bevel gears. The essential parts of the gearing device are: the conical cam 4 of the driving shaft with bevel gear 5 and the friction cylinder 6 at the driven shaft with bevel gear 7.

The driving shaft with cone 4 and driving gear 5 at the base of the cone is movable and splined at the end part 8 to the spline fitting 10, which is coupled to the power shaft 9. Said spline fitting rotates freely in bearing support 26; the other end of the driving shaft is bearing supported at 22 in a member 24 splined in casing 11. Member 24 is coupled to a screw motion device. Said screw motion device consists of a spindle screw 12 threaded in casing 11 to be operated by a turnable handwheel 13. Instead of this screw motion device any suitable control device might be used.

The driven shaft with driven gear 7 is bearing supported by casing part 28, the driven shaft coupled to the spline fitting 15. The friction cylinder 6 is movable inside and splined to said driven gear and pressed against the cone by compression spring 14.

The driving shaft is provided with a spring 16 to return the driving shaft. In operation upon turning the handwheel the conical driving shaft moves along its axis to connect said driving and driven shafts, first causing frictional force between cone and friction cylinder, forcing the latter to slide along the cone from a smaller to a larger diameter of the cone, gradually increasing the speed of friction cylinder and driven gear. At the larger diameter near the base of the cone the revolutions of both gears are synchronized and the gears ready to be meshed.

Finally the handwheel is locked as gears are now in positive mesh. Turning the handwheel in the opposite direction reverses above described process of gearing. The stored energy of the springs 14 and 16 return the driving shaft and friction cylinder to neutral position, thereby gradually decreasing the speed of the driven shaft.

The dotted lines show the position of cone and friction cylinder at different phases, 17 and 18 at neutral and 19 and 20 at mesh period.

Ball bearings are provided at the rotating parts: bearing 21 supporting the end of the driving shaft at bearing support 26, bearing 22 supporting the other end part of the driving shaft at the shaft shoulder 23 in the movable fork housing 24 at bearing support 27, bearing 25 supporting the driven shaft at bearing support 28.

I claim as my invention:

In a combined friction and toothed gearing: the combination with a driving and a driven shaft and a driving and a driven gear, with a power shaft movably connected to said driving shaft and with control means to move and lock said driving shaft; a friction cone carried by said driving shaft and a friction cylinder carried by said driven shaft for engagement with the friction cone, said driving gear mounted to the base of said friction cone, and said friction cylinder movably mounted inside and splined to said driven gear, and a compression spring to press said friction cylinder against said friction cone.

ARTHUR BERNDT.

REFERENCES CITED

The following references are of record in the file of this patent:

UNITED STATES PATENTS

| Number | Name | Date |
|---|---|---|
| 886,191 | Dearing | Apr. 28, 1908 |
| 1,215,413 | Robertson | Feb. 13, 1917 |
| 1,832,111 | George | Nov. 17, 1931 |

FOREIGN PATENTS

| Number | Country | Date |
|---|---|---|
| 608,174 | France | Apr. 17, 1926 |